J. A. CHENEY.
END GATE CLEAT.
APPLICATION FILED NOV. 21, 1910.
1,066,996.
Patented July 8, 1913.
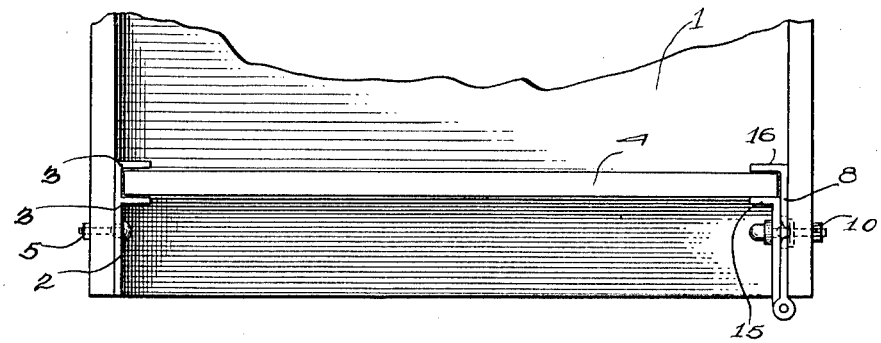
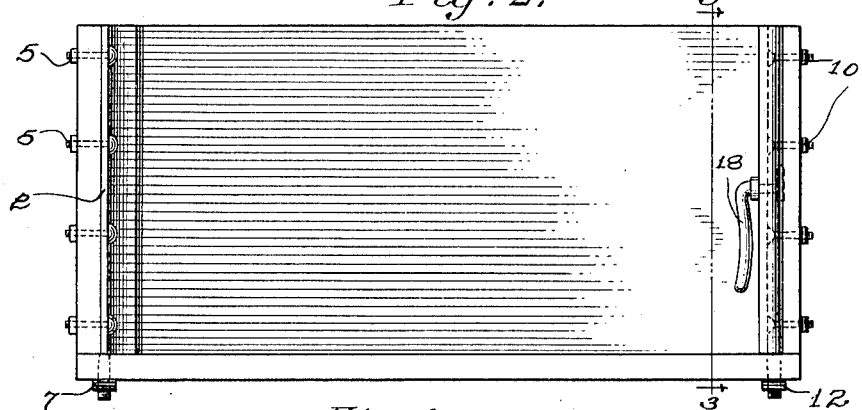
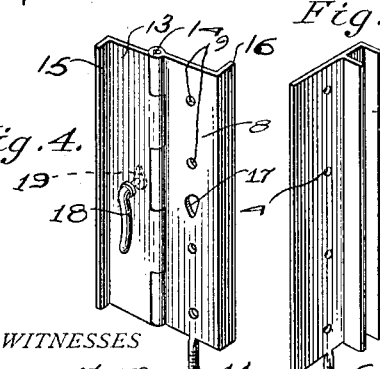
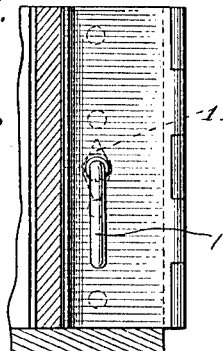
WITNESSES
INVENTOR
John A Cheney
By E. E. Vrooman,
his Attorney

UNITED STATES PATENT OFFICE.

JOHN A. CHENEY, OF SHENANDOAH, IOWA.

END-GATE CLEAT.

1,066,996. Specification of Letters Patent. Patented July 8, 1913.

Application filed November 21, 1910. Serial No. 593,518.

*To all whom it may concern:*

Be it known that I, JOHN A. CHENEY, a citizen of the United States, residing at Shenandoah, in the county of Page and State of Iowa, have invented certain new and useful Improvements in End-Gate Cleats, of which the following is a specification, reference being had therein to the accompanying drawing.

This invention relates to end gates, and has for its object the production of an end gate cleat which allows the quick attaching or detaching of an end gate to a wagon.

Another object of this invention is the production of a cleat which is provided with locking means for facilitating the holding of the gate in engagement with the wagon.

This invention also has other objects and advantages which will be pointed out in the following specification and claim. Of course, it should be understood that the same is subject to changes in detail and structural arrangement as falls within the scope of the appended claim.

In the drawings: Figure 1 is a top plan view of the end of a wagon showing the end gate secured thereto. Fig. 2 is a rear view of the wagon showing the end gate carried thereby. Fig. 3 is a transverse sectional view of the wagon taken on line 3—3 looking in the direction of the arrow. Fig. 4 is a detail perspective view of the swinging cleat-member. Fig. 5 is a perspective view of the socket portion adapted to receive one end of the end gate.

Referring to the drawings by numerals 1 designates the body of a wagon which carries upon one side thereof a socket plate 2 which socket plate is provided with a pair of ribbed portions 3 formed integral with the body thereof. The ribbed portions 3 are adapted to straddle one end of the end gate 4 and hold the same in place upon the wagon body. The socket plate 2 is provided with a plurality of alined apertures 4, through which are adapted to pass bolts 5 for securing the plate to the sides of the wagon body. The plate 2 is also provided upon its lower end with a depending bolt portion which is formed integral therewith, and a nut 7 is threaded upon the lower bolt portion 6, thereby holding the socket plate 2 in firm engagement with the body of the wagon. Since the bolt member passes through the bottom of the wagon body, it will be obvious that the same will do away with the usual strap used for holding the sides in engagement with the bottom of the wagon body.

The swinging cleat member is carried by the opposite side of the wagon body as illustrated in Fig. 1 and comprises a stationary portion 8 which portion is provided with a plurality of alined apertures 9, through which pass bolts 10 for securing the stationary member firmly in engagement with the side of the wagon body. The stationary member 8 is also provided with a depending bolt portion 11 which is formed integral with the stationary member 8 and a nut 12 is threaded upon said bolt portion 11 for facilitating the holding of said stationary member 8 in engagement with the wagon body. A swinging member 13 is hinged to the member 8 as at 14 and said member 13 is provided upon its outer end with a longitudinally extending angle flange portion 15. The stationary member 8 is also provided with an angularly extending flange portion 16 and when the hinge member 13 of the swinging cleat-member is thrown into engagement with the stationary member 8, as shown in Fig. 1, one end of the end gate 4 will be tightly clamped between the flange-members 15 and 16, while the other end will be positioned between the flange portions 3 of the socket plate 2. The stationary member 8 is provided intermediate its ends with an aperture 17 which aperture tapers toward its lower end.

The hinge member 13 is provided with a locking lever 18 which extends through the plate 13 and carries at its outer end a tapering foot 19. When the hinge member 13 is thrown back upon the plate 8, the locking lever 18 is thrown so as to extend upwardly thereby allowing the foot 19 to be readily inserted in the aperture 17. By throwing the lever 18 downwardly after the foot has been placed in the aperture 17, the two plates will be firmly locked together, since the point of the foot 19 will extend in an opposite direction to the small end of the aperture.

From the foregoing description, it will be readily seen that this invention discloses means for readily attaching the end gate to the body of a wagon. It also provides efficient means which consists of a comparatively small number of parts for allowing the end gate of a wagon to be readily attached and detached.

If it is so desired the cleat may be made so as to do away with the depending bolt-portion and the usual means may be used for securing the wagon body to the bottom thereof.

What I claim is:—

A sheet metal end gate attachment adapted to be secured to the rear end of a wagon to hold the end gate in place, said attachment comprising a stationary member, means provided by said member for securing the same in place, a bolt depending from said member intermediate the longitudinal edges thereof, for securing said stationary member to the bottom of a wagon, a swinging member of less width than the stationary member hinged to said stationary member and provided with a vertical flange which projects at right angles to the swinging member and which is adapted to engage one surface of the end gate, and a locking lever carried by said swinging member for engaging said stationary member to hold said swinging member in a locking position, a shaft extending through said locking member, a substantially V-shaped head at one end of said shaft adapted to pass through the V-shaped opening of said attaching member, an operating handle at the opposite end of said shaft extending in opposite directions to the head whereby the head may be rotated after being passed through the opening and normally held in a locked position.

In testimony whereof I hereunto affix my signature in presence of two witnesses.

JOHN A. CHENEY.

Witnesses:
  I. M. Schmuder,
  Fred Nordstrom.

---

Copies of this patent may be obtained for five cents each, by addressing the "Commissioner of Patents, Washington, D. C."